US005738245A

United States Patent [19]

Tomioka

[11] Patent Number: 5,738,245

[45] Date of Patent: Apr. 14, 1998

[54] COMMODITY DISCHARGING DEVICE IN AUTOMATIC VENDING MACHINE

[75] Inventor: Akira Tomioka, Tokyo, Japan

[73] Assignee: Tomy Co., Ltd., Tokyo, Japan

[21] Appl. No.: 594,525

[22] Filed: Jan. 31, 1996

[30] Foreign Application Priority Data

Feb. 6, 1995 [JP] Japan .................................... 7-041236

[51] Int. Cl.[6] ........................................ B65G 59/00

[52] U.S. Cl. .................................... 221/207; 221/304

[58] Field of Search ............................ 221/202, 200, 221/203, 207, 263, 265, 277, 304

[56] References Cited

U.S. PATENT DOCUMENTS

| | | | |
|---|---|---|---|
| 4,460,106 | 7/1984 | Moulding, Jr. | 221/1 |
| 5,176,290 | 1/1993 | Scharzli | 221/203 |
| 5,259,532 | 11/1993 | Schwarzli | 221/304 |

*Primary Examiner*—Kenneth Noland
*Attorney, Agent, or Firm*—Oliff & Berridge

[57] ABSTRACT

A commodity discharging device in an automatic vending machine, which can easily change the area of the commodity discharging opening, is disclosed. The commodity discharging device comprises: a drum which is rotatable with respect to a shaft extending in a vertical direction and is provided with a commodity discharging opening penetrating in a vertical direction, so as to discharge a commodity via said commodity discharging opening by rotating said drum through a predetermined angle; and an opening regulating member provided on the drum, which can change the effective opening area of said commodity discharging opening by overlapping said commodity discharging opening due to rotation thereof.

7 Claims, 19 Drawing Sheets

FIG.21A
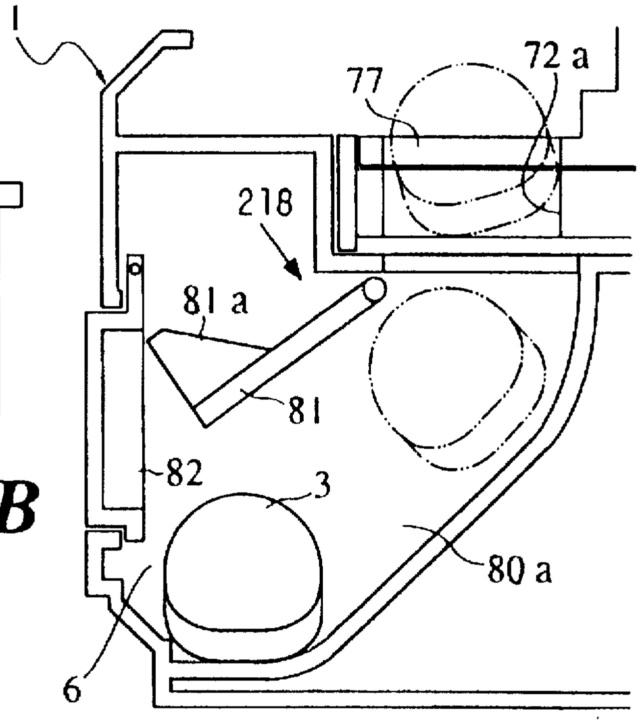
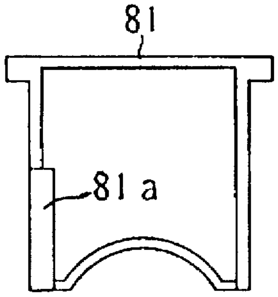
FIG.21B
FIG.22
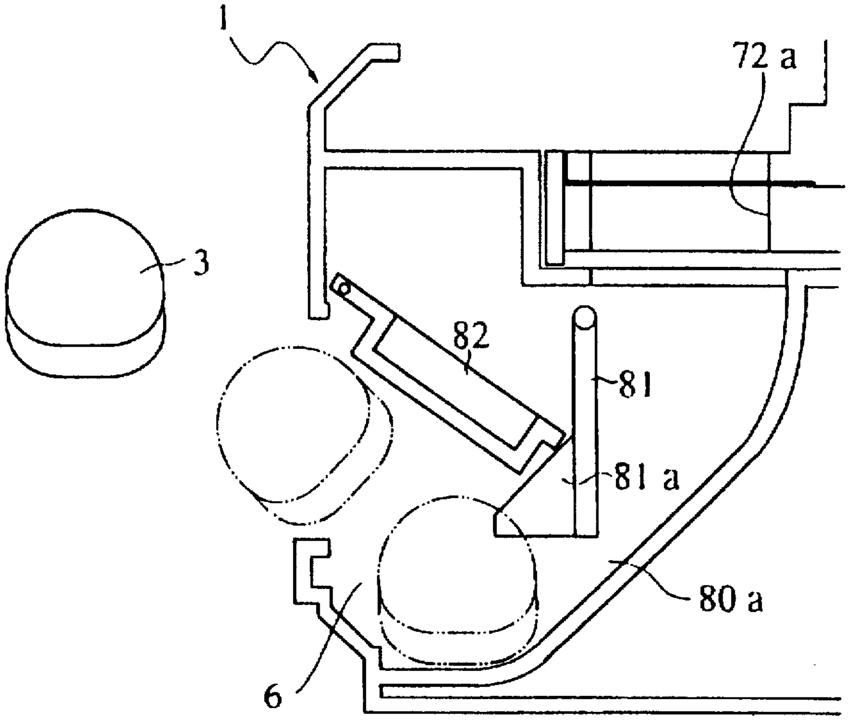

COMMODITY DISCHARGING DEVICE IN AUTOMATIC VENDING MACHINE

BACKGROUND OF THE INVENTION

1. Field of the Invention

The present invention relates mainly to a small-size automatic vending machine for selling commodities put in plastic capsules (hereinafter referred to as capsule commodities) intended for children.

2. Description of Related Art

Automatic vending machines of this type are arranged in front of the stores, the landings of staircases in the department stores and the like. As shown in FIG. 26, in an automatic vending machine 90, when a buyer puts in one or two normal coins (for example, 100-yen coin) and turns a handle 91, a capsule commodity is discharged at a commodity take-out port 92 so that the buyer takes out the capsule commodity from the commodity take-out port 92 by hand.

On the other hand, the automatic vending machine 90 is provided with a coin sorting device and a commodity discharging device. The coin sorting device discriminates whether the put-in coin is the normal coin or not, and allows the handle 91 to make one turn in the clockwise direction only when the put-in coin is the normal coin. On the other hand, the commodity discharging device includes a drum connected to the handle 91 via a gear mechanism. When the handle 91 makes one turn, the drum is rotated by a given magnitude so that one capsule commodity is discharged to the commodity take-out port via a commodity discharging opening provided at the drum. As coin sorting devices, there are one type which discriminates truth or falsehood of one coin and another type which discriminates truth or falsehood of two coins, while, as commodity discharging devices, there are one type which is provided with a drum having a commodity discharging opening corresponding to a large capsule commodity and another type which is provided with a drum having a commodity discharging opening corresponding to a small capsule commodity.

However, the conventional automatic vending machine has the following problems:

Specifically, since the exclusive-use coin sorting device was used per the put-in number, when, for example, changing a price, it was necessary to change the automatic vending machine itself to one which corresponds to the price after the change, or remove the coin sorting device itself from the automatic vending machine for changing to one which corresponded to the price after the change.

Further, since the exclusive-use commodity discharging device was used per size of the capsule commodity, when, for example, changing a size of the capsule commodity to be sold, it was necessary to change the automatic vending machine itself to one which corresponded to the price after the change.

SUMMARY OF THE INVENTION

The present invention has been made for solving the latter of such problems. Therefore, an object of the present invention is to provide a commodity discharging device in an automatic vending machine, which can easily change the area of the commodity discharging opening.

In accordance with one aspect of the present invention, the commodity discharging device in an automatic vending machine, comprising: a drum which is rotatable with respect to a shaft extending in a vertical direction and is provided with a commodity discharging opening penetrating in a vertical direction, so as to discharge a commodity via said commodity discharging opening by rotating said drum through a predetermined angle; and an opening regulating member provided on the drum, which can change the effective opening area of said commodity discharging opening by overlapping said commodity discharging opening due to rotation thereof.

In such a commodity discharging device, the opening regulating member which can change the effective opening area of the commodity discharging opening by overlapping the commodity discharging opening, is provided on the drum. Therefore, even when a size of the capsule commodity to be sold is changed, the size change of the commodity can be dealt with only by rotating the opening regulating plate relative to the drum without changing the automatic vending machine.

Preferably, the opening regulating plate has an approximate disk shape and is rotatable with respect to the shaft, and a hole having approximately the same shape as the commodity discharging opening is formed at a position corresponding to the commodity discharging opening, in the opening regulating plate, and one of the opening regulating plate and the drum is provided with a positioning projection, and the other of the drum and the opening regulating plate is provided with a positioning hole for interfitting with the positioning projection at a position to keep the changed effective opening areas.

BRIEF DESCRIPTION OF THE DRAWINGS

The above and further objects and novel features of the present invention will become more fully understood from the following detailed description when the same is read in connection with the accompanying drawings. It is to be expressly understood, however, that the drawings are for purpose of illustration only and are not intended as a definition of the limits of the present invention, and wherein.

Figure 10:
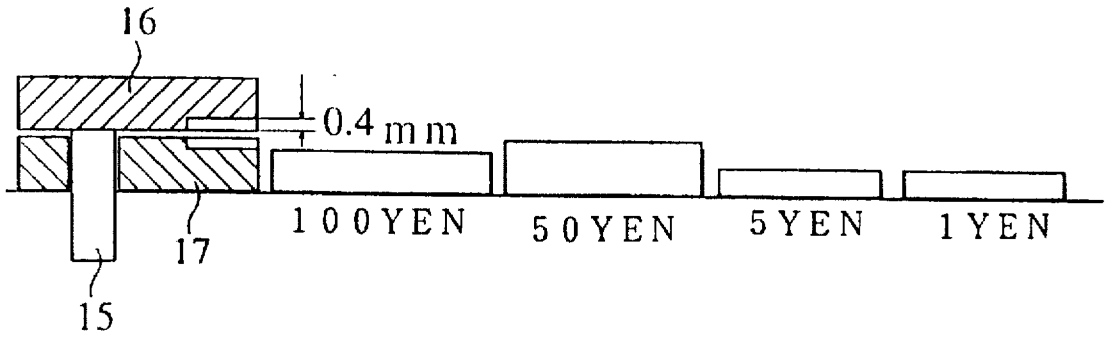
Figure 11:
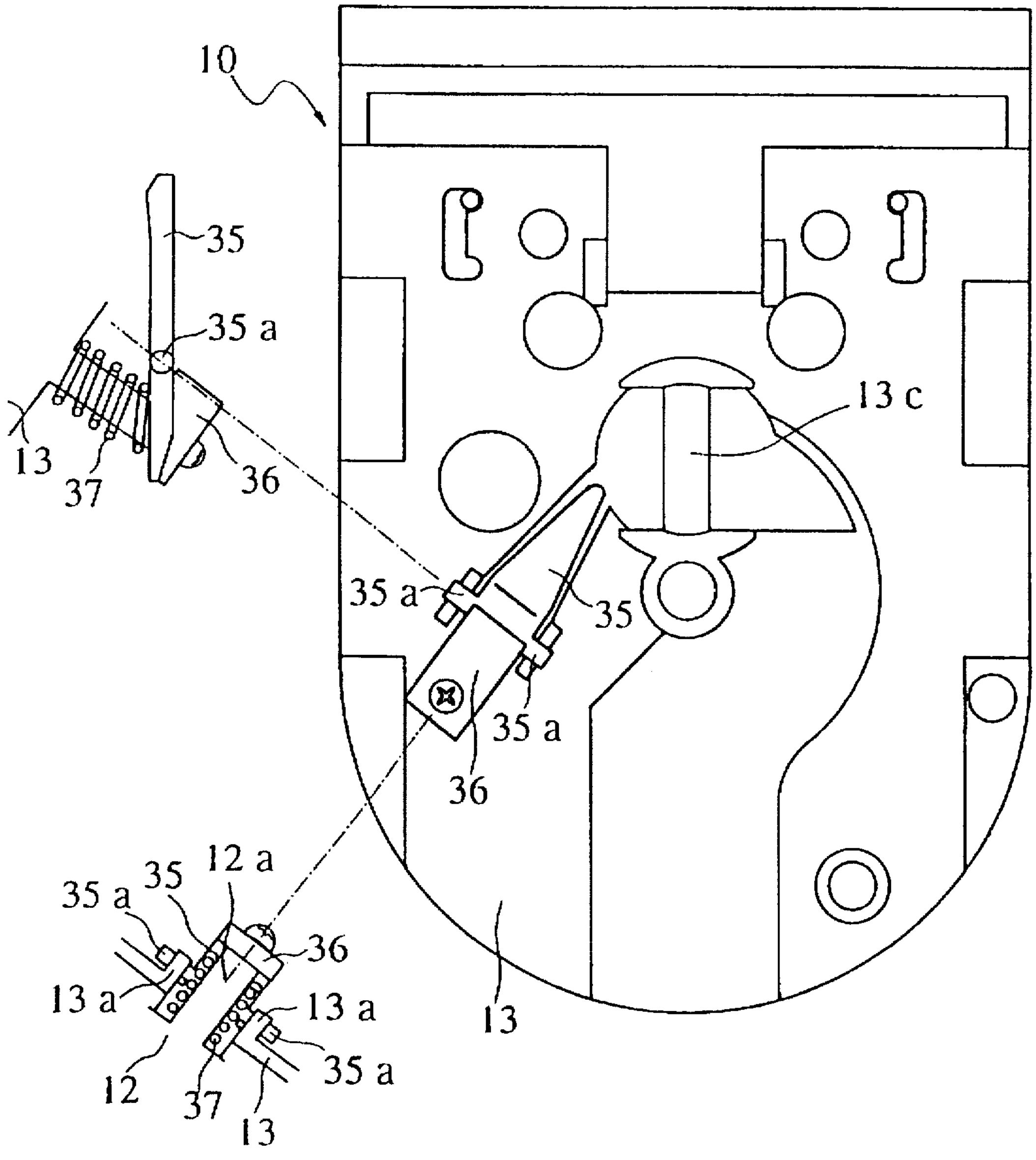
Figure 12A:
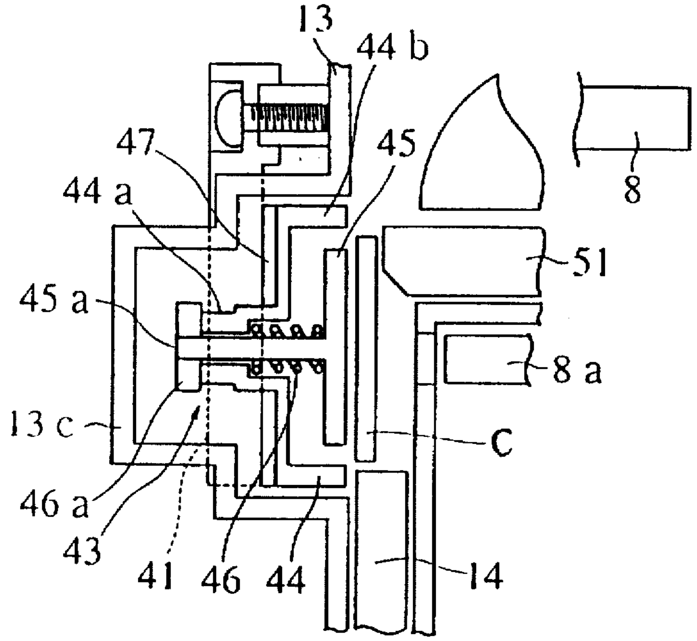
Figure 12B:
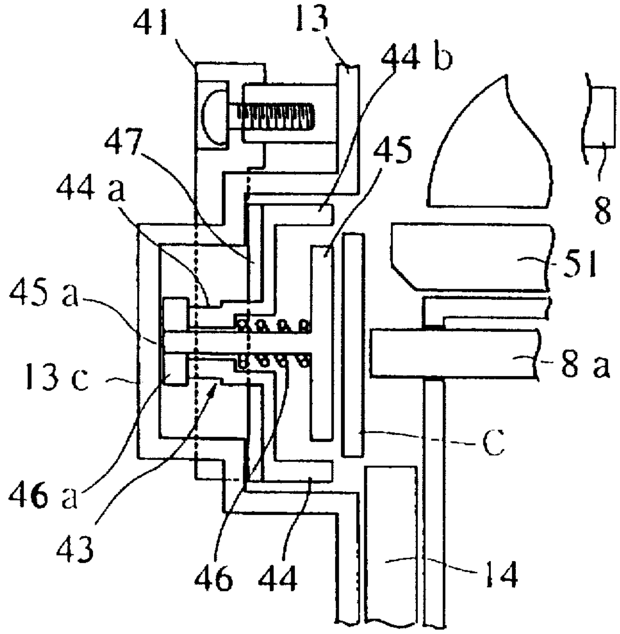
Figure 13:
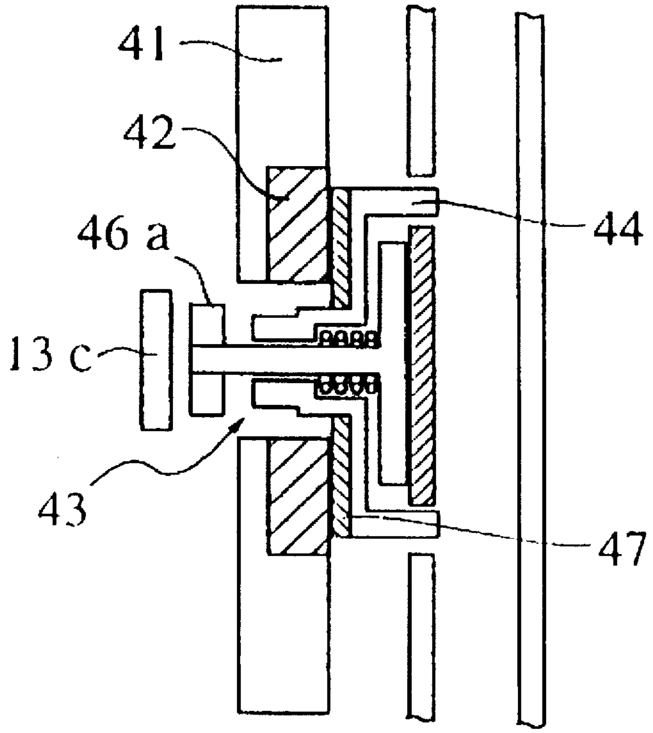
Figure 14A:
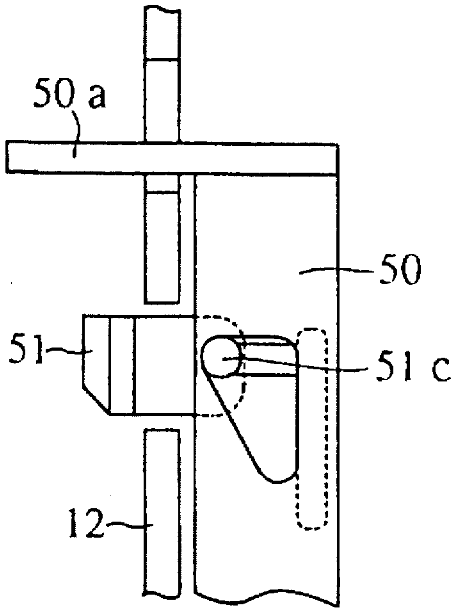
Figure 14B:
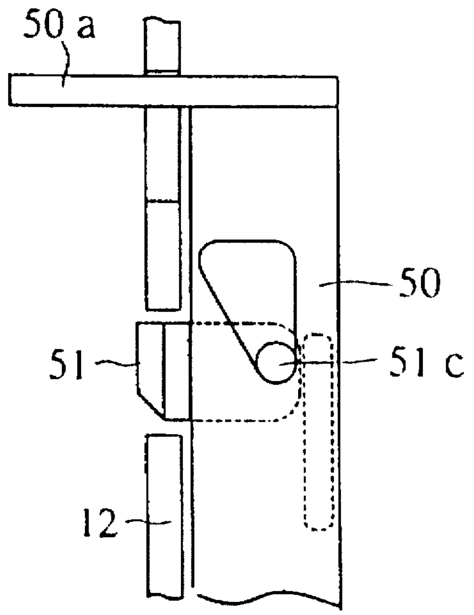
Figure 15A:
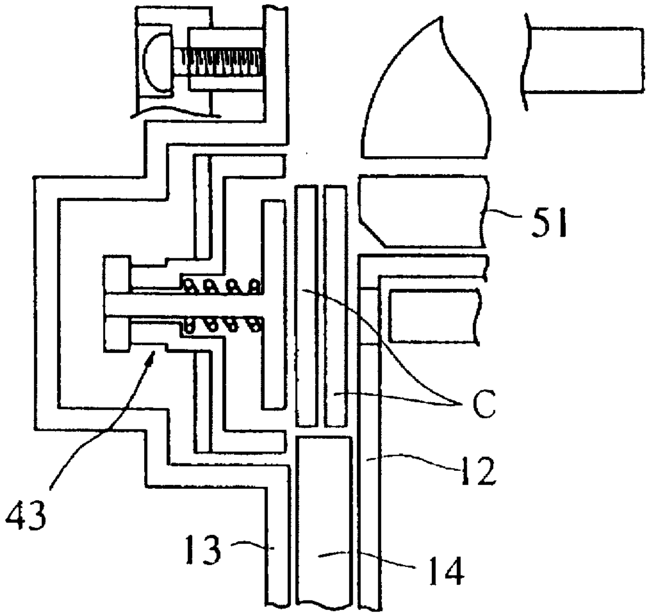
Figure 15B:
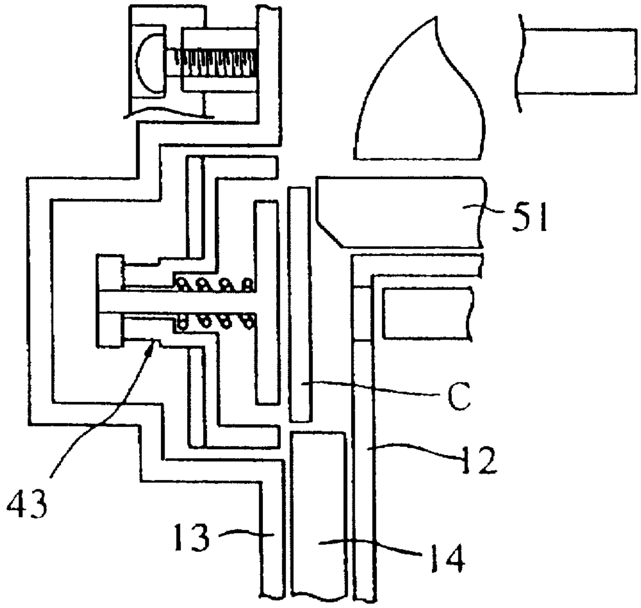
Figure 16:
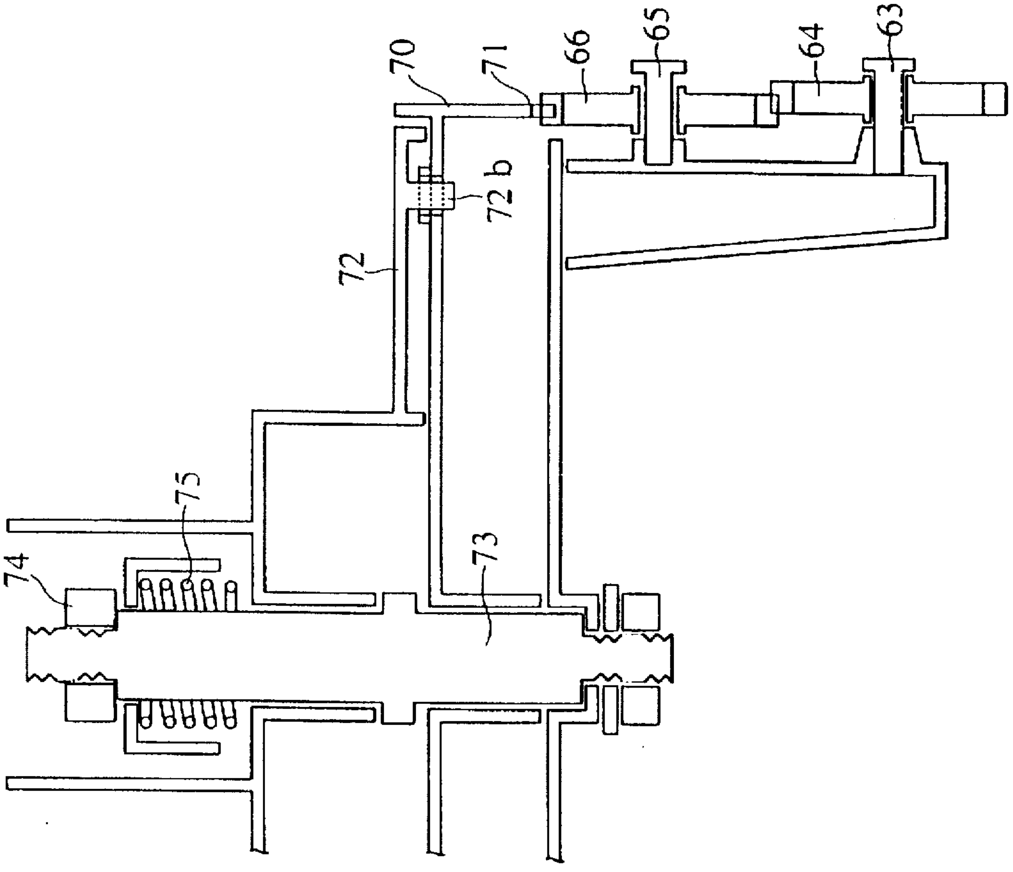
Figure 17:
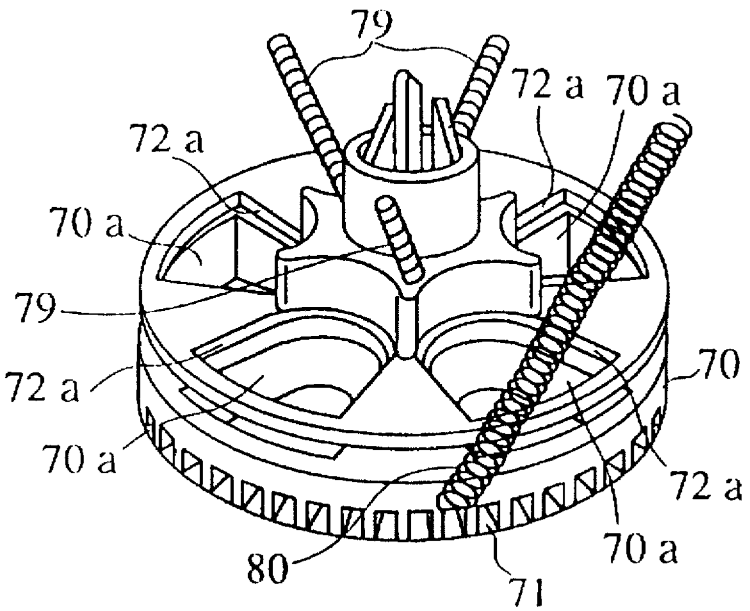
Figure 18:
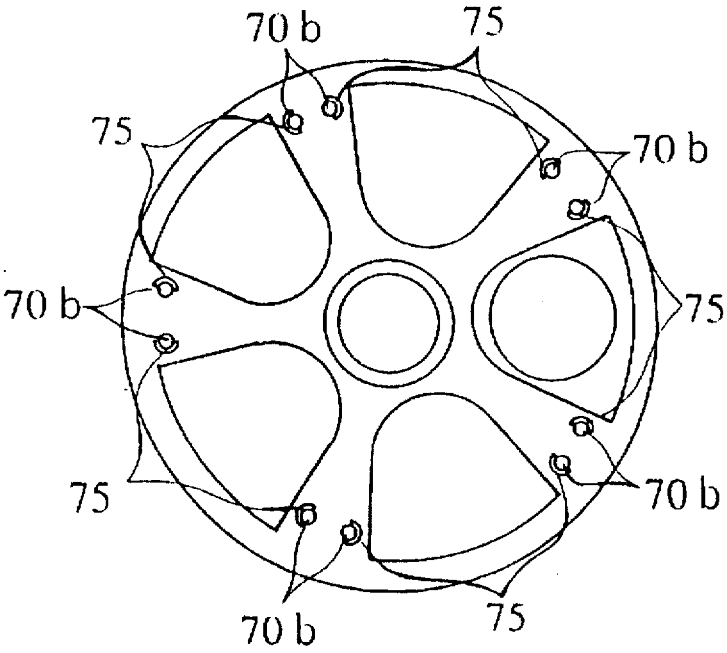
Figure 19:
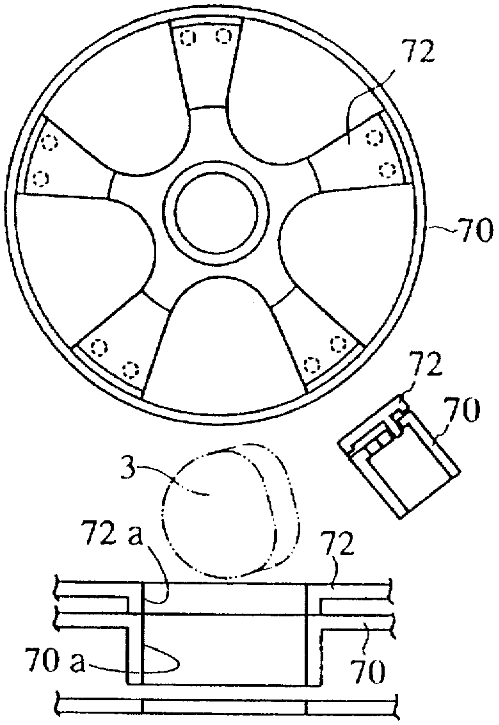
Figure 20:
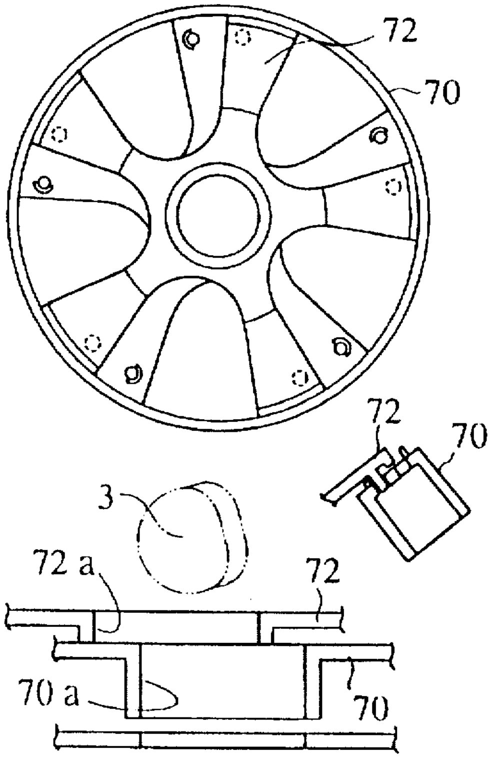
Figure 23:
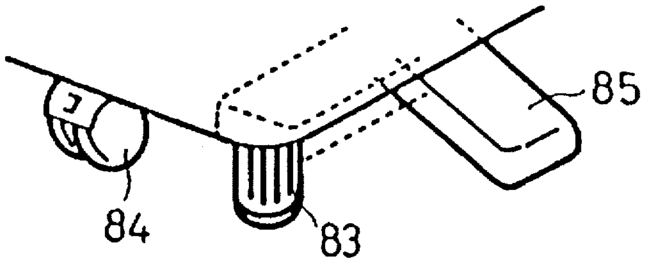
Figure 24:
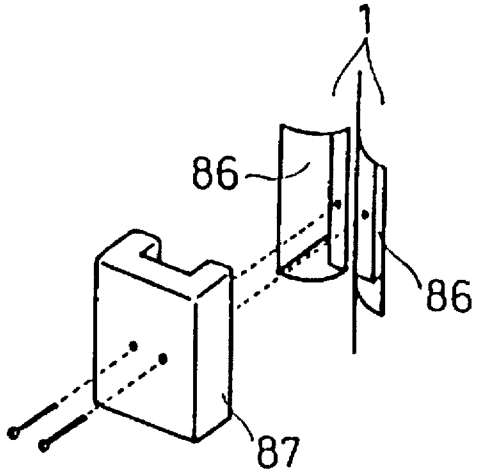
Figure 25:
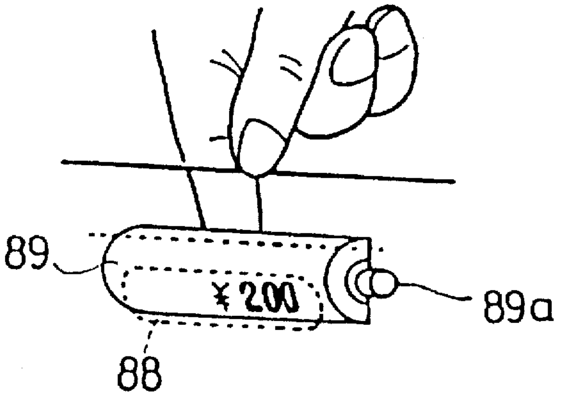
Figure 26:
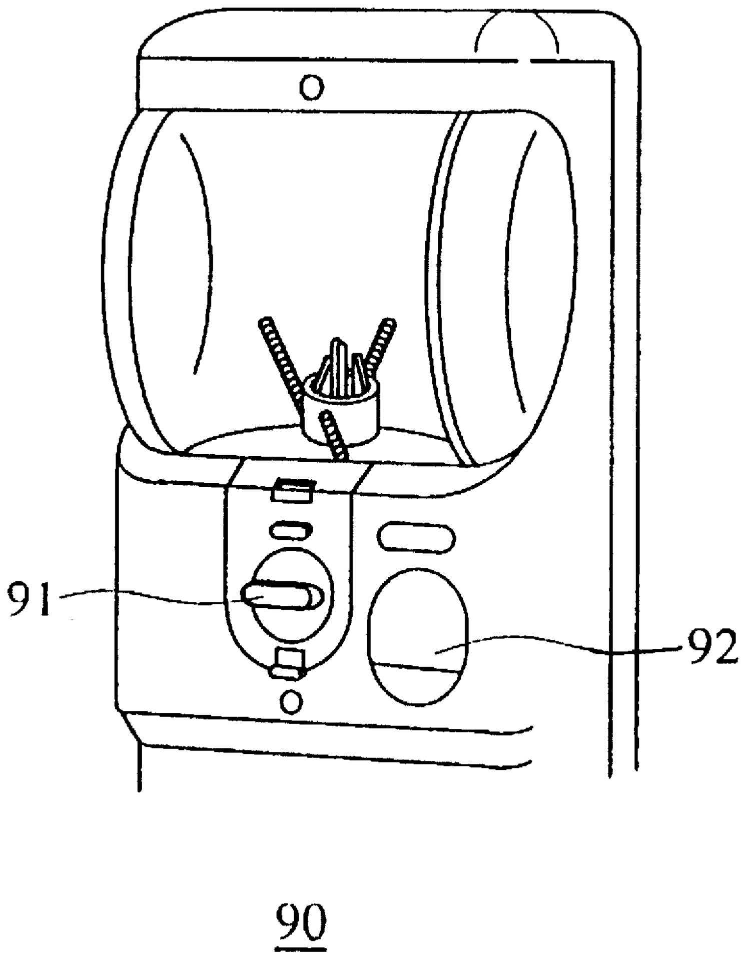

PIG. 9 is a back-side view for explaining an operation of a reverse-rotation preventing lever of the embodiment;

FIG. 10 is a diagram for comparing thicknesses of various coins;

FIG. 11 is a back-side view for explaining a pressing plate of the embodiment;

PIG. 12A is a vertical sectional view showing a state of a mechanism for coin return of the embodiment, and FIG. 12B is a vertical sectional view showing another state thereof;

FIG. 13 is a diagram for explaining an operation of a false coin capturing device of the embodiment;

FIG. 14A is a side view for showing a state of a passage regulating member of the embodiment, and FIG. 14B is a side view for showing another state thereof;

FIG. 15A is a side view for showing a state of the passage regulating member of the embodiment, and FIG. 15B is a side view for showing another state thereof;

FIG. 16 is a vertical sectional view showing a half portion of a commodity discharging device of the embodiment;

FIG. 17 is a perspective view of a drum and an opening regulating plate of the commodity discharging device of the embodiment;

FIG. 18 is a plan view of the drum of the commodity discharging device of the embodiment;

FIG. 19 is a diagram for explaining an operation of the opening regulating plate of the commodity discharging device of the embodiment;

FIG. 20 is a diagram for explaining the operation of the opening regulating plate of the commodity discharging device of the embodiment;

FIG. 21A is a vertical sectional view, seen from right, of a commodity take-out port of a commodity discharging mechanism of the embodiment;

FIG. 21B is an elevation view of the door shown in FIG. 21A;

FIG. 22 is a vertical sectional view, seen from right, of the commodity take-out port of the commodity discharging mechanism of the embodiment;

FIG. 23 is a perspective view showing an underside portion of the automatic vending machine of the embodiment;

FIG. 24 is a perspective view showing a back-side portion of the automatic vending machine of the embodiment;

FIG. 25 is a perspective view of a price displaying portion of the automatic vending machine of the embodiment; and FIG. 26 is a perspective view of a conventional automatic vending machine.

PREFERRED EMBODIMENT OF THE INVENTION

Hereinafter, an embodiment according present invention will be explained with reference to the drawings.

Figure 1:
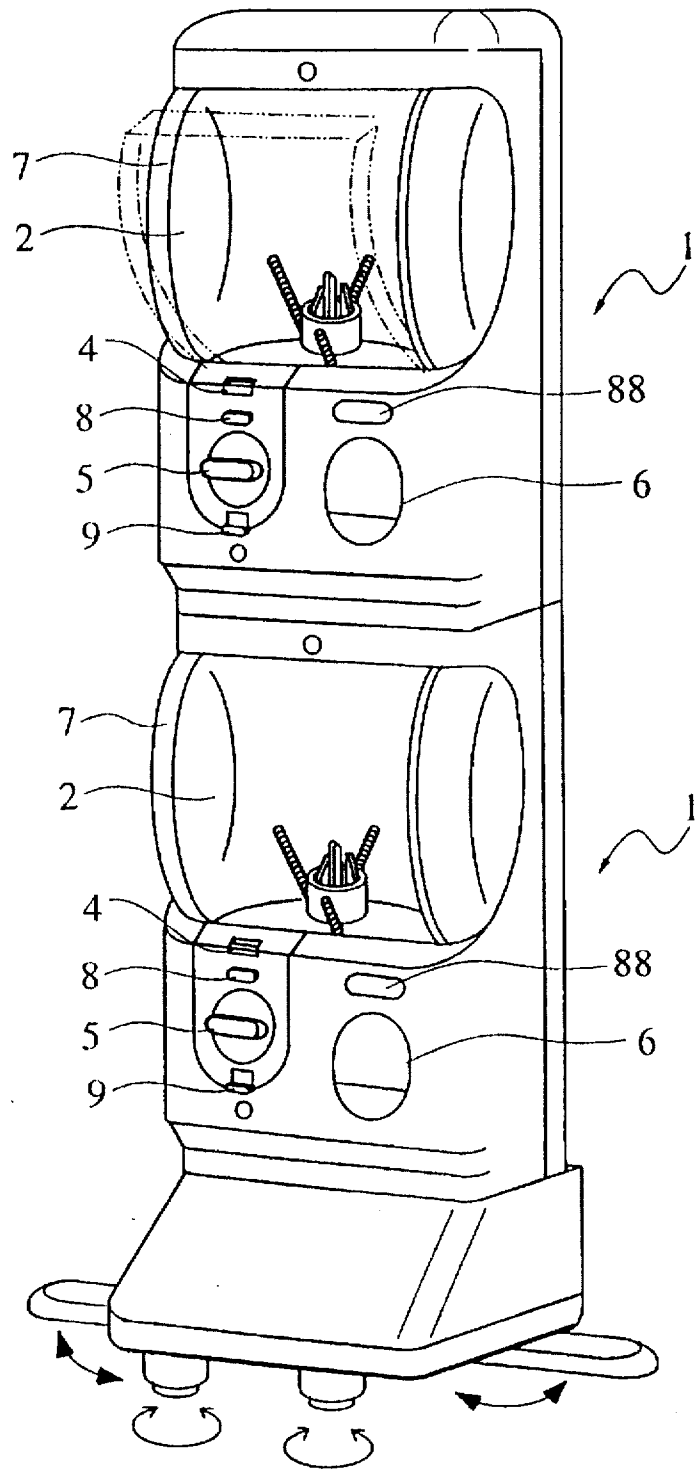
FIG. 1 is a perspective view of a state where automatic vending machines of the embodiment are double-layered.

FIG. 1 is a perspective view of double-layered automatic vending machines. In the automatic vending machine 1, capsule commodities 3 (FIG. 2) are filled in a commodity storage section 2. By putting a required number of given coins into a coin put-in slot 4 and achieving one turn of a handle 5 in the clockwise direction, only one of the capsule commodities 3 comes out at a commodity take-out port 6. Further, in the automatic vending machine 1, the filling of the capsule commodities 3 are achieved by opening a front cover 7 toward this side as shown by two-dot chain lines. Further, in the automatic vending machine 1, by pushing a return button 8, a wrongly put-in coin or the like is returned at a return port 9.

Figure 2:
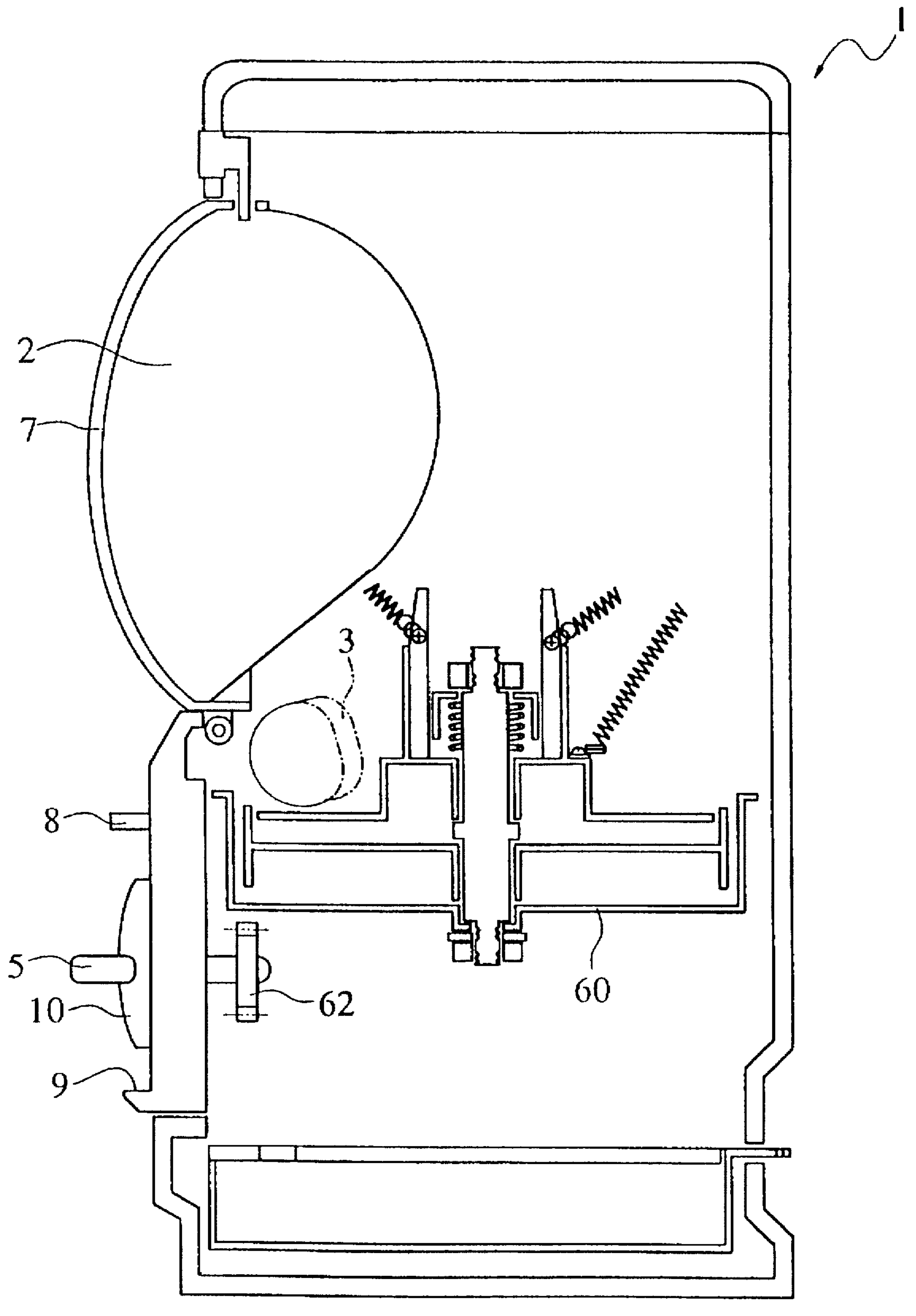
FIG. 2 is a longitudinal sectional view, seen from right, of the automatic vending machine of the embodiment.

Details of the structure of the automatic vending machine 1 will be described. As shown in FIG. 2, the automatic vending machine 1 is provided with a coin sorting device 10 (FIG. 3) and a commodity discharging device 60.

Figure 4:
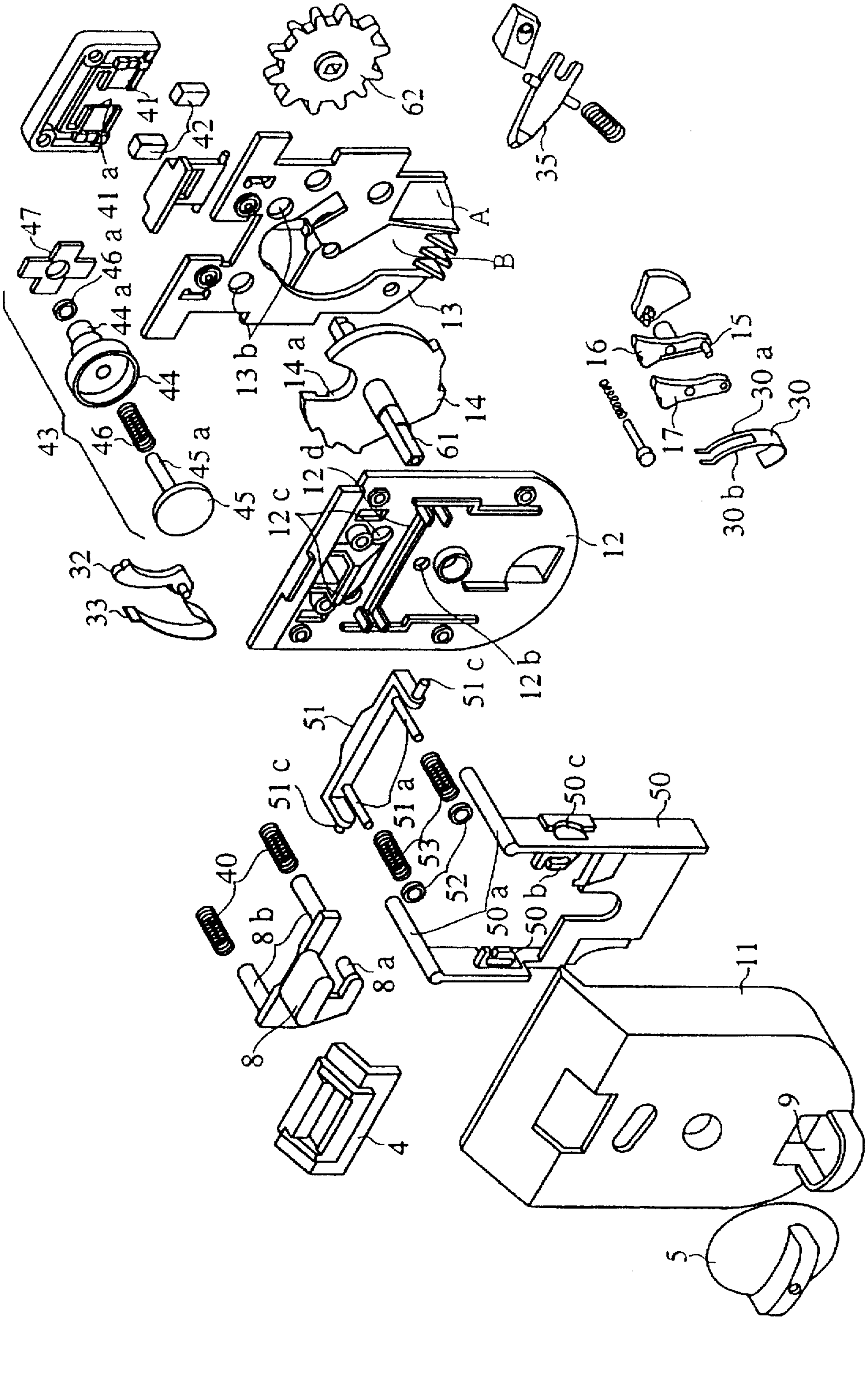
FIG. 4 is an exploded perspective view of the coin sorting device of the embodiment.
Figure 5:
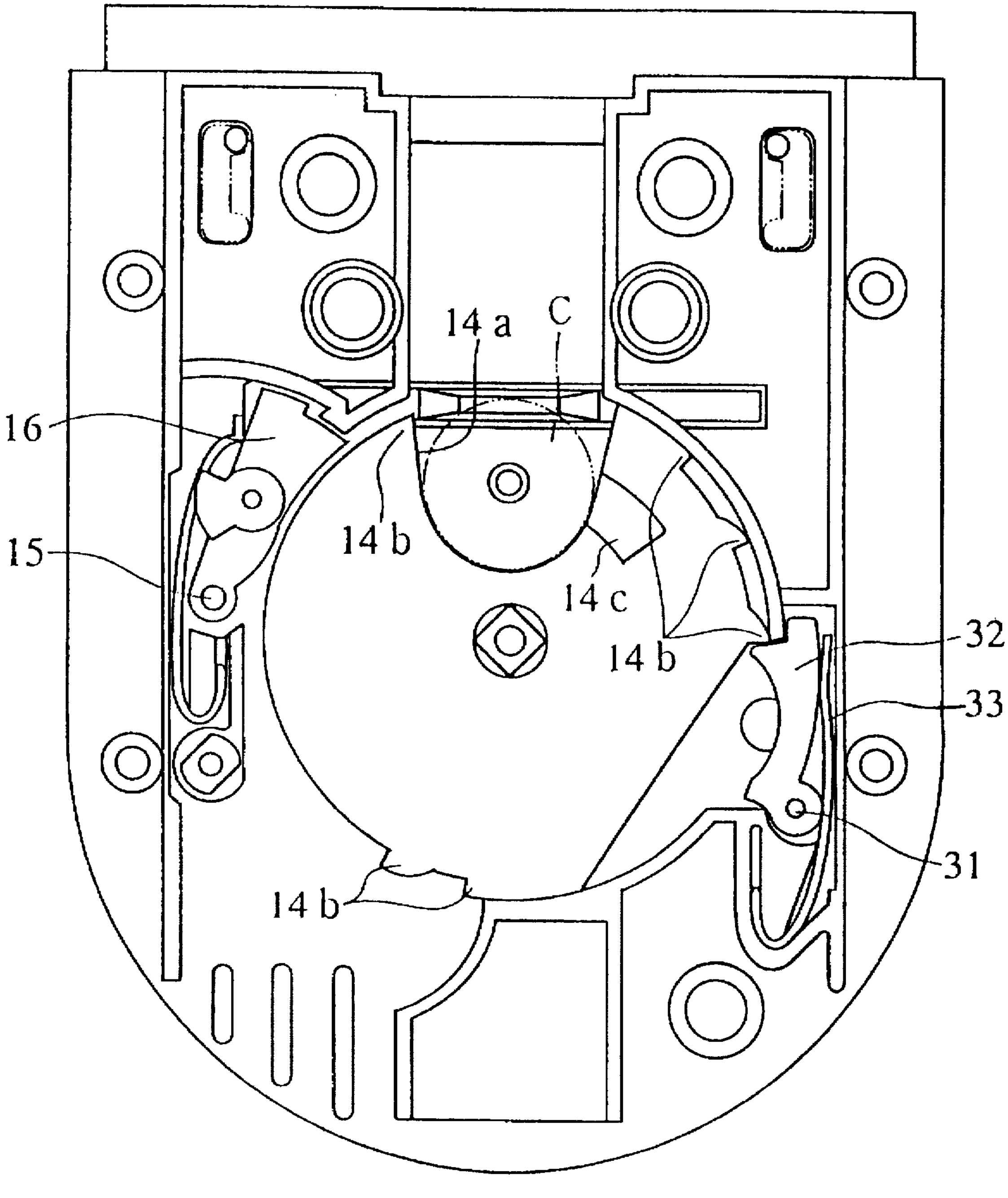
FIG. 5 is a back-side view showing the coin sorting device of the embodiment, with a portion thereof omitted.
Figure 6A:
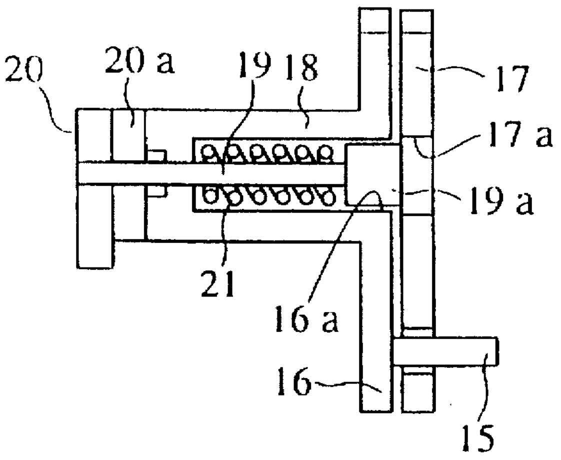
FIG. 6A is a vertical sectional view showing coin sorting levers of the embodiment.
Figure 6B:
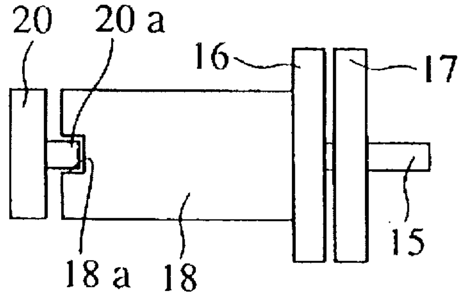
FIG. 6B is a plan view thereof.
Figure 6C:
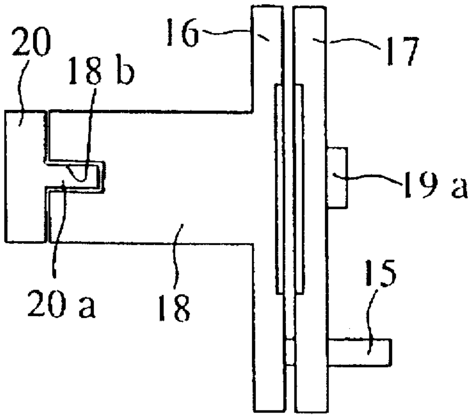
FIG. 6C is an elevational view thereof.

As shown in FIG. 4, the coin sorting device 10 is provided with a body 11, an outer surface 12 and an inner frame 13, wherein a turn plate 14 coupled to the handle 5 is provided between the outer frame 12 and the inner frame 13. The turn table 14 follows to turn upon turning of the handle 5. As shown in FIG. 5, the turn plate 14 is provided with a cut-out portion 14*a* which can receive a put-in coin. On the other hand, as shown in FIG. 6A, FIG. 6B and FIG. 6C, in the neighborhood of the turn plate 14 on the left thereof in FIG. 5, coin sorting levers 16 and 17 are provided in a double-layered fashion so as to rock right and left about a shaft 15. The coin sorting levers 16 and 17 can rock right and left independently. The coin sorting levers 16 and 17 are biased toward the turn plate 14 by means of bifurcated resilient pieces 30*a* and 30*b* of a plate spring 30 (FIG. 4), respectively. As shown in FIGS. 6A, 6B and 6C, the coin sorting lever 16 is provided with a tubular body 18, and a coupling pin 19 is provided as penetrating the tubular body 18 (FIG. 6A). A knob 20 is attached to a rear end of the coupling pin 19. Further, the coin sorting lever 16 is formed with a hole 16*a* concentrically with the tubular body 18. Further, a spring 21 is disposed in the tubular body 18. By means of the spring 21, a head 19*a* of the coupling pin 19 is biased in a direction of projecting from the hole 16*a*. Further, at a rear end of the tubular body 18 are provided two kinds of engaging grooves 18*a* and 18*b* of different depths (FIGS. 6B and 6C). A rectangular engaging piece 20*a* provided at the back side of the knob 20 is arranged to sit in either of the engaging grooves 18*a* and 18*b*. When the engaging piece 20*a* is seated in the shallow engaging groove 18*a* as shown in FIG. 6B, a front surface of the head 19*a* becomes coplanar with a front surface of the coin sorting lever 16 as shown in FIG. 6A. On the other hand, when the engaging piece 20*a* is seated in the deep engaging groove 18*b* as shown in FIG. 6C, a front portion of the head 19*a* projects from the front surface of the coin sorting lever 16. On the other hand, the coin sorting lever 17 is provided with a hole 17*a* which can receive the head 19*a* when the front portion of the head 19*a* projects from the front surface of the coin sorting lever 16. It is arranged that, when the head 19*a* is inserted into the hole 17*a* of the coin sorting lever 17, the coin sorting lever 17 is coupled to the coin sorting lever 16 so as to be operated integrally.

Figure 7:
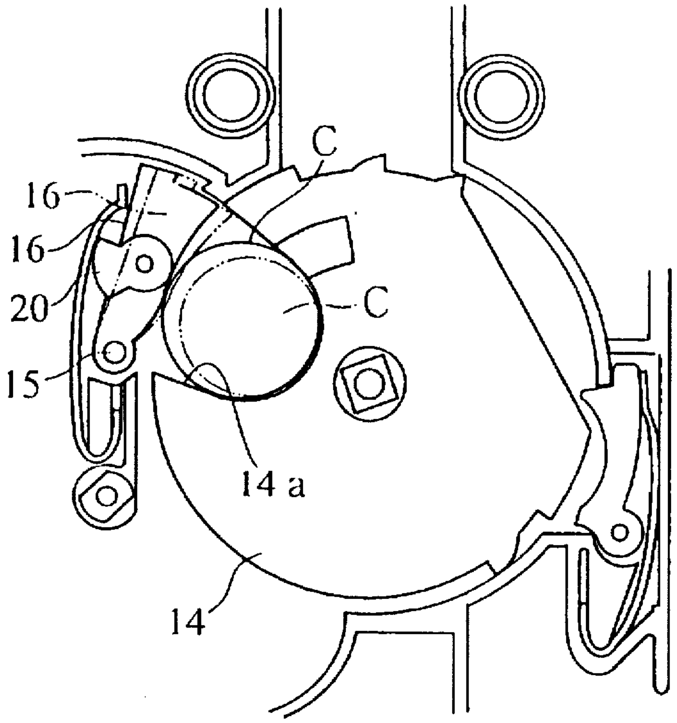
FIG. 7 is a back-side view for explaining operations of the coin sorting levers of the embodiment.
Figure 8:
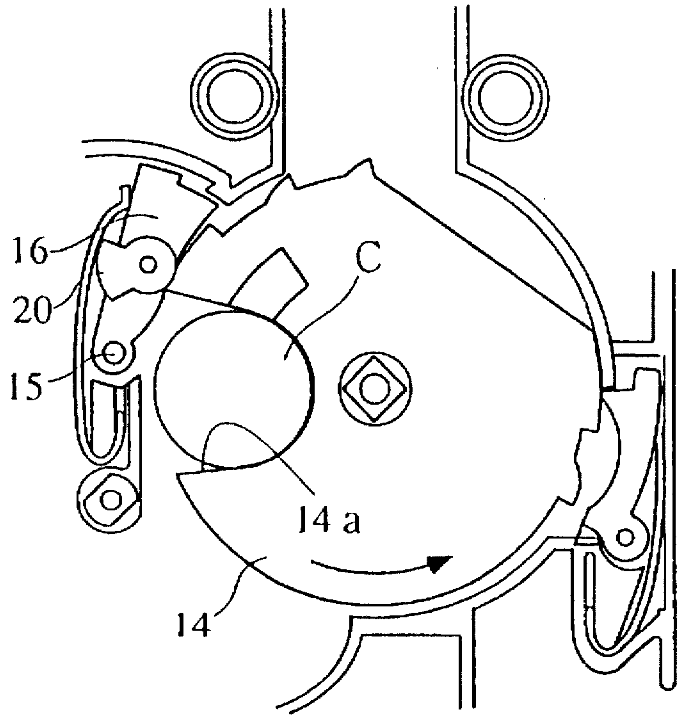
FIG. 8 is a back-side view for explaining operations of the coin sorting levers of the embodiment.
Figure 9:
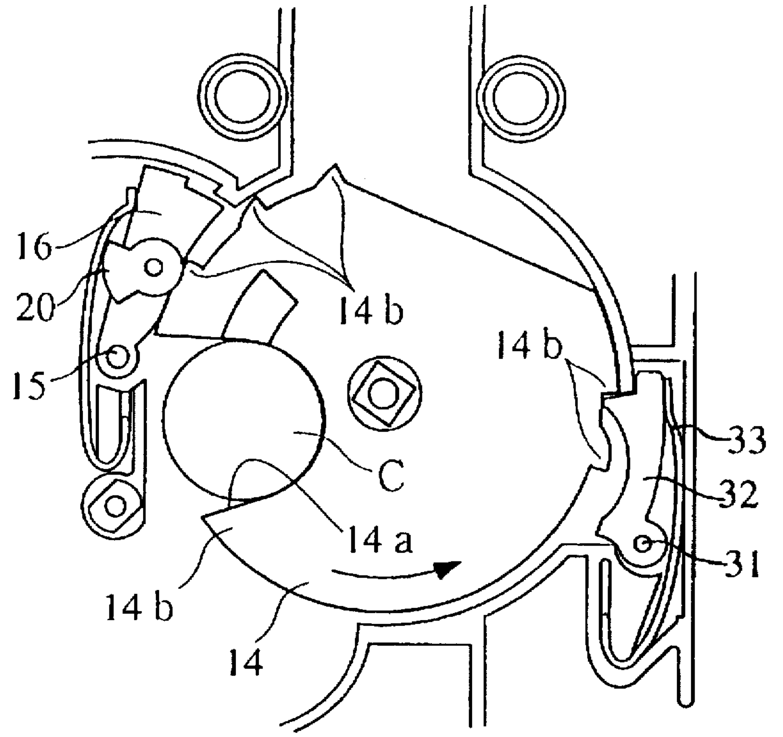

Operations of the thus structured coin sorting levers 16 and 17 will be explained with reference to the coin sorting lever 16 as an example. As shown in FIG. 7, in case a normal coin (100-yen coin in the embodiment) C indicated by a solid line in the same figure is placed in the cut-out portion 14*a* of the turn plate 14, when the handle 5 is turned to rotate the turn plate 14, a slidably-contacting intermediate portion of the coin sorting lever 16 is pushed by the normal coin C (solid line in the same figure) so that the coin sorting lever 16 is retreated relative to the turn plate 14. Thus, since the tip (engaging portion) of the coin sorting lever 16 does not abut an end portion (coin sorting pawl portion) of the cut-out portion 14*a* of the turn plate 14, the turn plate 14 is set in a state where rotation thereof is not prevented by the coin sorting lever 16 as shown in FIGS. 8 and 9. Then, when the turn plate 14 turns to a certain degree, the coin C held in the cut-out portion 14*a* falls by its own weight to a passage A (FIG. 4) so as to be stored in a non-shown container. On the other hand, when a coin C' smaller than the normal coin C, for example, a 1-yen coin (broken line in the same figure), is placed in the cut-out portion 14*a* of the turn plate 14, since the intermediate portion of the coin sorting lever 16 is not pushed by the coin C', the coin sorting lever 16 is not retreated relative to the turn plate 14. Thus, the tip (engaging portion) of the coin sorting lever 16 abuts the end portion (coin sorting pawl portion) of the cut-out portion 14*a* of the turn plate 14 (two-dot chain line in FIG. 7) so that rotation of the turn plate 14 is prevented. In this manner, the discrimination between the normal coin C and the coin C' smaller than it is achieved. Since the operation of the coin sorting lever 17 is the same as that of the coin sorting lever 16, detailed explanation thereof is omitted. In case of a capsule commodity 3 which requires two normal coins C, since the coins are put in the cut-out portion 14*a* in a double-layered state (see FIG. 15A), it is necessary to ascertain truth or falsehood of both coins. Accordingly, by operating the knob 20, it is necessary to set the coin sorting lever 17 to be operable independently of the coin sorting lever 16. On the other hand, in case of a capsule commodity 3 which requires one normal coin C, only one coin is placed in the cut-out portion 14*a* (see FIG. 15B). Accordingly, by operating the knob 20, it is necessary to set the coin sorting lever 17 to be operable integrally with the coin sorting lever 16.

As described above, the discrimination between the normal coin C and the coin C' smaller than it is performed by the coin sorting levels 16 and 17. On the other hand, discrimination between the normal coin (for example, 100-yen coin) C and a coin C' larger than it (500-yen coin or 10-yen coin) is performed, in this embodiment, by setting a width of the coin put-in slot 4 to be substantially equal to a width of the normal coin C.

Further, in this embodiment, it is arranged to prevent malfunction of the coin sorting levers 16 and 17 due to a difference in thickness between the normal coin (for example, 100-yen coin) C and another coin C' (for example, 50-yen coin, 5-yen coin or 1-yen coin) placed in the cut-out portion 14*a*. Specifically, in case of Japanese coins, as typically shown in FIE. 10, a thickness of the 100-yen coin is 1.7 mm, a thickness of the 50-yen coin is 1.8 mm and thicknesses of the 5-yen and 1-yen coins are 1.5 mm. On the other hand, in this embodiment, a thickness of each of the coin sorting levers 16 and 17 is set to 1.8 mm. Accordingly, in case of selling a capsule commodity 3 at 200 yen, if the 100-yen coin C and the other coin (50-yen coin, 5-yen coin or 1-yen coin) are put in, it is possible that the 100-yen coin being the normal coin C abuts against the two coin sorting levers 16 and 17 simultaneously. In this case, it is possible that either of the coin sorting levers 16 and 17 malfunctions so that the turn plate 14 turns. Accordingly, for preventing such a situation, intermediate portions (slidably-contacting portions ) of confronting surfaces of the coin sorting levers 16 and 17 are cut out by about 0.4 mm, respectively, so as to prevent those portions from getting in contact with one 100-yen coin simultaneously. Of course, a depth of the cut-out should be changed depending on a thickness of the coin sorting lever 16, 17. In summary, it is sufficient to set the depth to such a value that prevents the two coin sorting levers 16 and 17 from being operated due to the simultaneous contact with one formal coin C when two coins are put in.

Further, in this embodiment, it is arranged that only one capsule commodity 3 is discharged for one operation of the handle 5. Specifically, as shown in FIGS. 5 and 9, a plurality of engaging pawls 14*b* are provided on the outer circumference of the turn plate 14, while in the neighborhood of the turn plate 14 on the right thereof in the same figure is provided a reverse-rotation preventing lever 32 which rocks right and left about a shaft 31. The reverse-rotation preventing lever 32 is biased toward the turn plate 14 by means of a plate spring 38. Once the engaging pawl 14*b* of the turn plate 14 exceeds the reverse-rotation preventing lever 32, the reverse rotation of the turn plate 14 is prevented by engagement of the reverse-rotation preventing lever 32 with the engaging pawl 14*b* of the turn plate 14 as shown in FIG. 9, even by turning the handle 5 in the reverse direction.

In this embodiment, a further arrangement is provided for preventing malfunction of the coin sorting levers 16 and 17 and for preventing rotation of the turn plate 14 when a perforated coin (for example, 5-yen coin) other than the normal coin C is put in. Specifically, as shown in FIG. 11, the inner frame 13 is provided with a pressing plate 35. The pressing plate 35 is formed into a wedge shape at its tip side, and shafts 35*a*, 35*a* provided at the side of its intermediate portion are supported by a pair of bearing plates 13*a*, 13*a*. Further, the pressing plate 35 is, at its rear end portion, resiliently supported between a pressing piece 36 screwed to a boss 12*a* of the outer frame 12 and a spring 37 wound around the boss 12*a*. Since a surface of the pressing piece 36 at a side of the pressing plate 35 is an inclined surface, when the rear end of the pressing plate 35 is pressed onto the pressing piece 36 by the spring 37, the tip of the pressing plate 35 is pressed onto the turn place 14. Accordingly, when the coin passes at the underside of the tip of the pressing plate 35, the coin is pressed toward the outer frame 12 by the tip of the pressing plate 35 so that malfunction of the coin sorting levers 16 and 17 is prevented. Further, when the perforated coin is put in, the pressing plate 35 engages into a hole of the perforated coin so as to prevent rotation of the turn plate 14. When rotation of the turn plate 13 is prevented by the pressing plate 35, it is okay to achieve reverse rotation of the handle 5. The pressing plate 35 does not prevent rotation of the turn plate 14 upon forward rotation of the turn plate 14. This is because, since the turn plate 14 is provided with an inclined portion 14*c* being continuous with the cut-out portion 14*a* and having an upgrade in a direction away from the cut-out portion 14*a* (FIG. 5), the tip of the pressing plate 35 is gradually raised along the inclined portion 14*c* when the handle 5 makes the forward rotation.

Further, in this embodiment, an arrangement is provided for returning a wrongly put-in coin and particularly for returning an iron false coin having a size and a thickness equal to those of the normal coin C. Specifically, as shown in FIG. 4, the return button 8 is provided with a coin pushing rod 8*a* and holder holding rods 8*b*, 8*b*. The coin pushing rod 8*a* can project into the cut-out portion 14*a* of the turn plate 14 at its initial position, passing through a hole 12*b* of the outer frame 12. On the other hand, the holder holding rods 8*b*, 8*b* with springs 40, 40 wound therearound, pass through holes 12*c*, 12*c* of the outer frame 12 and holes 13*b*, 13*b* of the inner frame 13 and extend to the back side of the inner frame 13 at their tips. Further, a magnet holder 41 is screwed to the tips of the holder holding rods 8*b*, 8*b*. The magnet holder 41 has a T-shaped cut-out portion 41*a*, and permanent magnets 42, 42 are mounted at both sides of the cut-out portion 41*a*. As shown in FIGS. 3, 11, 12A and 12B and so forth, the inner frame 13 is provided with a "U"-shaped abutting portion 13*c* projecting to the back side thereof. In front of the abutting portion 13*c* is provided a false coin capturing member 43. As shown in FIGS. 4 12A and 12B, the false coin capturing member 43 is constituted by a false coin holder 44 provided with a shaft sleeve 44*a* and a pressing plate 45 provided with a shalt 45*a* which is inserted into the shaft sleeve 44*a* of the false coin holder 44. The shaft 45*a* of the pressing plate 45 passes through the shaft sleeve 44*a* and is mounted at its tip with a driven seat 46*a*. The pressing plate 45 is movable forward and backward and biased in the forward direction by means of a spring 46 provided in the shaft sleeve 44*a*. On the other hand, the false coin holder 44 is provided with a rim portion 44*b*. A depth of the rim portion 44*b* is set to a value which can capture two false coins in a state where the pressing plate 45 is fully received therein. At the back side of the false coin holder 44 is provided a cross-shaped iron plate 47 attracted by the magnets 42, 42.

Next, an operation of the thus structured false coin capturing member 43 will be described as follows. In the state where the return button 8 is not pushed, the return button 8 is pressed out from the body 11 due to the action of the springs 40, 40. Along with this, the magnet holder 41 and the false coin holder 44 attracted to the magnets 42, 42 of the magnet holder 41 are also in the state where they have moved forward (FIG. 12A). At this time, due to the action of the spring 46, a front surface of the pressing plate 45 is located at a position where it is coplanar with a back surface of the turn plate 14. Accordingly, by means of the pressing plate 45, the coin put in the cut-out portion 14*a* of the turn plate 14 is prevented from falling off the cut-out portion 14*a*. On the other hand, when the return button 8 is pushed, the coin C existing in the cut-out portion 14*a* of the turn plate 14 at its initial position is pushed backward by the coin pushing rod 8*a*, while the magnet holder 41 and the false coin holder 44 attracted thereto are retreated. At this time, since the pressing plate 45 is also retreated simultaneously, the coin falls at the back side of the turn plate 14 and is discharged via a passage B (FIG. 4) so as to be led to the return port 9. In the foregoing, explanation has been made in case of one coin C, but it is the same also in case of two coins.

On the other hand, in case a put-in coin is a false coin and further is made of iron, when the false coin is placed in the cut-out portion 14*a* of the turn body 14, the false coin together with the pressing plate 45 is attracted deep into the false coin holder 44 due to the magnetic force of the magnets 42, 42 (FIG. 13). If a next put-in coin is also a false coin, this false coin is also attracted to the foregoing false coin to enter the false coin holder 44. Although it is shown in FIG. 13 that only one false coin can be entered, it is actually arranged that up to two false coins can be entered in the false coin holder 44. On the other hand, if the return button 8 is pushed in the state where the false coin is entered in the false coin holder 44, the false coin holder 44 is retreated integrally with the magnets 42, 42 while holding the false coin. On the other hand, the false coin capturing member 43 abuts the "U"-shaped abutting portion 13*c* on the way so that only the magnet holder 41 is retreated leaving the false coin capturing member 43. Thus, the magnetic force exerted on the false coin capturing member 43 is rapidly weakened so that the pressing plate 45 is pushed out due to the spring 46 and the false coin falls off the false coin holder 44 and is discharged via the passage B to be led to the return port 9.

Figure 3:
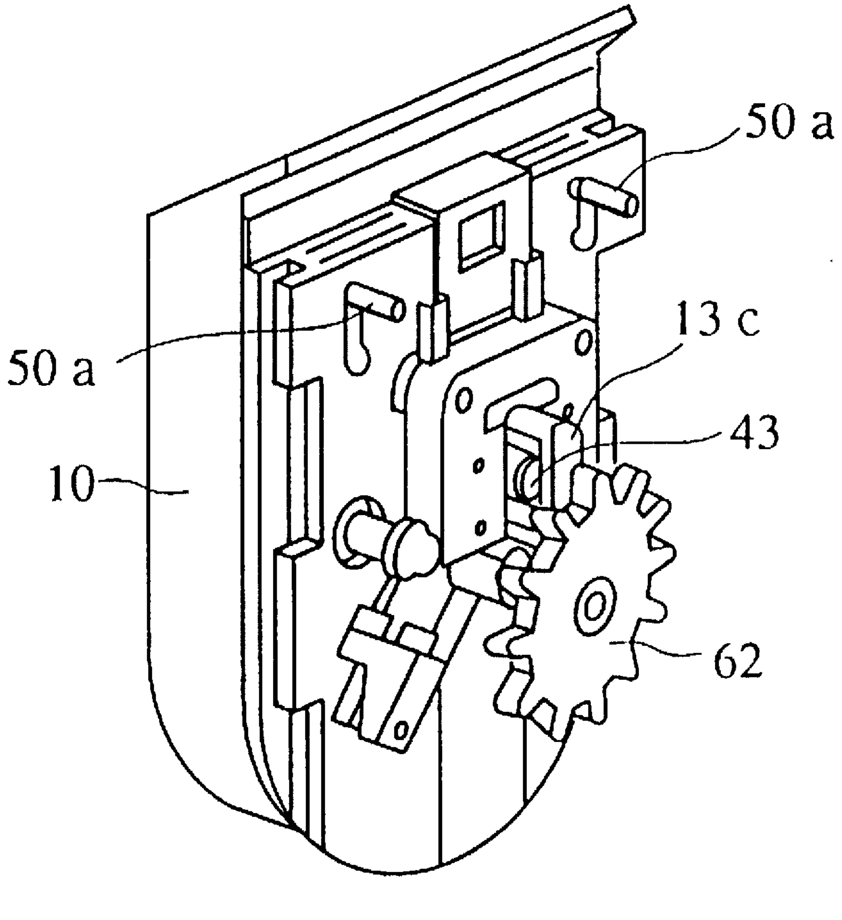
FIG. 3 is a perspective view, seen slantly from back, of a coin sorting device of the automatic vending machine of the embodiment.

It is further arranged that, in case a sold capsule commodity 3 is at a price of one normal coin C, when the normal coins C are put in successively, passing of the second and subsequent coins is prevented. Specifically, as shown in FIG. 3, a slider 50 (FIG. 4) which moves upward and downward integrally with two pins 50*a*, 50*a* projecting from the back side of the coin sorting device 10 is disposed between the body 11 and the outer frame 12. The slider 50 is provided with mounting portions 50*b*, 50*b* having hook-shaped cut-out portions. Into the cut-out portions of the mounting portions 50*b*, 50*b* are inserted rods 51*a*, 51*a* of a passage regulating member 51. Washers 52, 52 are mounted at rear ends of the rods 51*a*, 51*a* and springs 53, 53 are wound around the rods 51*b*, 51*b* so that the passage regulating member 51 is biased backward. The passage regulating member 51 can appear via a belt-shaped opening 12*d* provided at the outer frame 12. Further, the passage regulating member 51 is provided at its sides with pins 51*c*, 51*c* projecting sideward. The pins 51*c*, 51*c* project outward via triangular openings 50*c*, 50*c* of the slider 50. The passage regulating member 51 is prevented from moving upward and downward due to the outer frame 12 and allowed to move only forward and backward.

An operation of the passage regulating member 50 will be described. When the pins 50*a*, 50*a* are lowered, the slider 50 descends. At this time, the passage regulating member 51 moves backward relative to the slider 50 following the triangular openings 50*c*, 50*c* due to the biasing force of the springs 53, 53 so as to project into a coin put-in passage (FIG. 14A). By this, since the coin put-in passage has a depth corresponding to a size of one coin C and an upper end portion of the put-in coin C stops at a position where it overlaps with the passage regulating member 51 (see FIG. 5), the next coin C does not enter the cut-out portion 14*a* of the turn plate 14 (FIG. 15B). On the other hand, when the pins 50*a*, 50*a* are raised, the slider 50 ascends. The passage regulating member 51 moves forward following the triangular openings 50*c*, 50*c* against the biasing force of the springs 53, 53 so as to retreat from the coin put-in passage (FIG. 14B). By this, the coin put-in passage has a depth corresponding to a size of two coins C so that two coins enter the cut-out portion 14*a* of the turn plate 14 (FIG. 15A).

As shown in FIG. 4, since the main surface of the passage regulating member 51 is gradually raised at the center in a trapezoid shape, even if the passage regulating member 51 projects into the coin put-in passage, rotation of the turn plate 14 is not prevented. This is because, when the edge portion of the cut-out portion 14*a* of the turn plate 14 abuts the trapezoid-raised portion due to rotation of the turn plate 14, the passage regulating member 51 moves forward against the biasing force of the springs 53, 53 due to a force applied from the turn plate 14.

Next, the commodity discharging mechanism 60 will be described.

As shown in FIG. 4, a gear 62 (see FIGS. 2 and 8) is mounted on a shaft 61 of the handle 5 (turn plate 14). As shown in FIG. 16, a gear 64 mounted on a shaft 63 meshes with the gear 62, and further, a gear 66 mounted on a shaft 65 meshes with the gear 64. Further, a rack gear 71 attached to a drum 70 meshes with the gear 66. Accordingly, when the handle 5 is turned, the drum 70 is rotated with respect to a shaft 73 via the gears 62, 64 and 66 and the rack gear 71. As shown in FIG. 17, the drum 70 is provided with a plurality of hanging bell-shaped commodity discharging openings 70*a*. Further, on the drum 70 is provided a opening regulating plate 72 which is provided with openings 72*a* having the same shape as the hanging bell-shaped commodity discharging openings 70*a* and arranged at the same pitch. As shown in FIG. 16, the opening regulating plate 72 is pressed against the drum 70 due to a spring 75 disposed between a nut 74 screwed onto an upper end portion of the shall 73 and itself. Further, at the underside of the opening regulating plate 72 is provided one boss (positioning projection) 72*b* between the adjacent openings 72*a*, 72*a* of each pair. On the other hand, as shown in FIG. 18, the drum 70 is provided with two fitting holes (positioning holes) 70*b* between the adjacent commodity discharging openings 70*a*, 70*a* of each pair for selectively fitting over the foregoing boss 72*b*. By pulling out the bosses 72*b* from the fitting holes 70*b* in the state where the opening regulating plate 72 is separated from the drum 70 against the biasing force of the spring 75, the opening regulating plate 72 is allowed to rotate relative to the drum 70. Further, as shown in FIG. 18, at the edge portions of the fitting holes 70*b* are provided semicylindrical stoppers 75, respectively. Accordingly, when the opening regulating plate 72 is rotated in the clockwise or counter-clockwise direction, the bosses 72*b* abut the stoppers 75, respectively. Thus, if released from a hand in that state, the bosses 72*b* are surely fitted into the fitting holes 70*b* due to the biasing force of the spring 75. In this case, if the boss 72*b* is fitted into one of the fitting holes 70*b* between the adjacent commodity discharging openings 70*a*, 70*a* of each pair, as shown in FIG. 19, since the commodity discharging openings 70*a* of the drum 70 and the openings 72*a* of the opening regulating plate 72 are matched, it is possible to discharge a large capsule commodity 3. On the other hand, if the boss 72*b* is fitted into the other of the fitting holes 70*b* between the adjacent commodity discharging openings 70*a*, 70*a* of each pair, as shown in FIG. 20, since the commodity discharging openings 70*a* of the drum 70 and the openings 72*a* of the opening regulating plate 72 are not matched, a portion of each commodity discharging opening 70*a* is closed by the opening regulating plate 72 so that only a small capsule commodity 3 can be discharged. In this manner, effective opening areas of the commodity discharging openings 72*a* can be easily changed depending on a size of the sold capsule commodity 3. Here, the effective opening areas of the commodity discharging openings 72*a* are changed in two steps. On the other hand, it may also be arranged that the effective opening areas of the commodity discharging openings 72*a* are changed in three or more steps.

Further, in this embodiment, the opening regulating plate 72 is provided with rod-like springs 79 so as to ensure falling of the filled capsule commodity 3 into the commodity discharging opening 72*a*. Further, as shown in FIG. 17, on a commodity discharging passage 80*a* is provided a rod-like spring 80 for discharging the capsule commodities 3 one by one.

Further, in this embodiment, as shown in FIGS. 21A and 21B, an inner door 81 is provided in the commodity discharging passage 80*a* and an outer door 82 is provided at the commodity take-out port 6. When the outer door 82 is pushed, the outer door 82 abuts a triangular stopper 81*a* of the inner door 81 (FIG. 22) so as to prevent the inner door 81 from opening. By this, safety is ensured when a child or the like inserts a hand.

Further, as shown in FIG. 23, legs at the underside of the lower automatic vending machine 1 of FIG. 1 are in the form of adjusters 83 for adjusting a height thereof. Further, casters 84 are provided at the underside of the automatic vending machine 1 so that it can be freely carried by rolling them. Further, at the underside of the automatic vending machine 1 is provided one safety bar 85, which can be freely opened and closed, on each of the right and left sides. By projecting the safety bars 85 sideward, the automatic vending machine 1 can be installed stably.

[0031]

Further, as shown in FIG. 24, pockets 86 are provided right and left at the back side of the automatic vending machine 1. By inserting a joint member 87 of a "]" shape in section into the pockets 86, 86 of the adjacent automatic vending machines 1, 1 and screwing the joint member 87 to the adjacent automatic vending machines 1, 1, the automatic vending machines 1 can be connected in the transverse direction.

Further, as shown in FIG. 25, a semicylindrical plate 89 is provided at a display portion represented by a sign 88 in FIG. 1. The plate 89 includes two kinds of price displays. By rotating the plate 89 with respect to a shaft 89*a*, the price display at the display portion 88 can be changed.

Next, a using method of the thus structured automatic vending machine 1 will be briefly explained referring to the internal operations of the automatic vending machine 1.

First, explanation will be made to the case, as an example, wherein a small capsule commodity 3 corresponding to one normal coin C is sold. The coin sorting device 10 is pulled out upward from the body of the automatic vending machine 1, and the pins 50*a*, 50*a* (FIG. 3) at the back side of the coin sorting device 10 are lowered. Then, the passage regulating member 51 projects into the coin put-in passage (FIG. 14A) so that the device is set to the state where only one coin can be put in. Further, the knob 20 is turned so as to set the coin sorting levers 16 and 17 to be operated integrally. Thereafter, the coin sorting device 10 is attached to the body of the automatic vending machine 1. On the other hand, as shown in FIG. 20, the opening regulating plate 72 is rotated relative to the drum 70 to provide interference between the commodity discharging openings 70*a* of the drum and the openings 72*a* of the opening regulating plate 72 so as to set the effective opening areas of the commodity discharging openings 72*a* to be small. Further, the plate 88 is rotated to set the price display to be correct.

In this state, the coin is put in the coin put-in slot 4. In this case, a coin larger than the normal coin C can not enter the coin put-in slot 4, but only a coin smaller than the normal coin C enters the coin sorting device 10 via the coin put-in slot 4 to be fitted in the cut-out portion 14*a* of the turn plate 14.

Here, when the handle 5 is turned in the clockwise direction, if the coin is not the normal coin C, rotation of the turn plate 14 is prevented due to the coin sorting levers 16 and 17 so that the handle 5 is locked on the way. When the handle 5 is locked, the handle 5 is turned in the counterclockwise direction to return to the initial position and the return button 8 is pushed. Then, the pushing rod 8*a* pushes the coin in the cut-out portion 14*a*, and the false coin holder 44 and the pressing plate 45 move backward so that the coin falls off backward of the turn plate 14 to be led to the return portion 9 via the passage B. Even if the coin is put in wrongly, the coin is returned to the return port 9 by pushing the return button 8. Further, if the false coin is put in, it is captured by the false coin holder 44. By pushing the return button 8, the false coin is also returned to the return port 9.

On the other hand, if the coin is the normal coin C, since rotation of the turn plate 14 is not prevented by the coin sorting levers 16 and 17, it makes one forward rotation. In the course of this, the normal coin C falls off the cut-out portion 14*a*, and one rotation of the handle 5 rotates the drum 70 by one pitch so that one capsule commodity 3 comes out at the commodity take-out port 6.

Now, the case where a large capsule commodity 3 which requires two normal coins C is sold, will be explained. The coin sorting device 10 is pulled out upward from the body of the automatic vending machine 1, and the pins 50*a*, 50*a* (FIG. 3) at the back side of the coin sorting device 10 are raised. Then, the passage regulating member 51 disappears from the coin put-in passage (FIG. 14B) so that the device is set to the state where two coins can be put in. Further, the knob 20 is turned so as to set the coin sorting levers 16 and 17 to be operated independently. Thereafter, the coin sorting device 10 is attached to the body of the automatic vending machine 1. On the other hand, as shown in FIG. 19, the opening regulating plate 72 is rotated relative to the drum 70 to provide matching between the commodity discharging openings 70*a* of the drum and the openings 72*a* of the opening regulating plate 72 so as to set the effective opening areas of the commodity discharging openings 72*a* to be large. Further, the plate 88 is rotated to set the price display to be correct.

According to the thus structured automatic vending machine 1, the following effects can be achieved:

Specifically, even when a price of the capsule commodity 3 to be sold is changed, the price change of the capsule commodity 3 can be dealt with only by operating the coin sorting device 10 without changing the automatic vending machine 1 or the coin sorting device 10.

Further, even when a size of the capsule commodity 3 to be sold is changed, the size change of the capsule commodity 3 can be dealt with only by rotating the opening regulating plate 72 relative to the drum 70 without changing the automatic vending machine 1.

In the foregoing, explanation has been made to the embodiment achieved by the present inventors. However, it is needless to say that the present invention is not limited to such an embodiment, but various modifications can be made in a range not changing the gist thereof.

For example, in the foregoing embodiment, explanation has been made to the case where two coin sorting levers 16 and 17 are layered. However, three or more coin sorting levers may be layered.

Further, in the foregoing embodiment, the effective opening areas of the commodity discharging openings 72*a* are changed in two steps. However, the areas may be changed in three or more steps.

Further, in the foregoing embodiment, the portions of the confronting surfaces at the intermediate portions of the coin sorting levers 16 and 17 are cut out. However, in summary, it is sufficient that a gap is present between the confronting surfaces at least at the intermediate portions of the coin sorting levers 16 and 17. Accordingly, it may be arranged that the coin sorting levers 16 and 17 are layered via a fixed spacer.

Although explanation has been made in case of the coins as an example, it is also applicable to game coins or the like.

As described above, according to the commodity discharging device of the present invention, since the opening regulating member which can change the effective opening area of the commodity discharging opening by overlapping the commodity discharging opening, is provided on the drum, even when a size of the capsule commodity to be sold is changed, the size change of the commodity can be dealt with only by rotating the opening regulating plate relative to the drum without changing the automatic vending machine.

What is claimed is:

1. A commodity discharging device in an automatic vending machine comprising:

a drum which is rotatable on a shaft extending in a vertical direction and is provided with a commodity discharging opening penetrating in a vertical direction, for discharging a commodity through the commodity discharging opening by rotating the drum through a predetermined angle;

an approximately disc-shaped opening regulating member which is rotatable on the shaft and slidable axially and is provided with a commodity discharging hole having approximately the same shape as the discharging opening at a position corresponding to the discharging opening, for changing the effective opening area of the commodity discharging opening which depends on the degree of overlap caused by a rotation thereof; and a spring provided around the shaft, for giving the opening regulating member a biasing force to press it against the drum, wherein one of the opening regulating member and the drum comprises a positioning projection and the other comprises a plurality of positioning holes for engaging the positioning projection at a position to keep predetermined effective opening area, and change of the effective opening area is carried out by sliding the open regulating member axially away from the drum against the biasing force of the spring and by rotating the open regulating member to engage the positioning projection with another positioning hole.

2. A commodity discharging device as claimed in claim 1, wherein the drum is provided with a plurality of commodity discharging openings and the opening regulating member is provided with commodity discharging holes the number of which is equal to the number of the commodity discharging openings, one of the opening regulating plate and the drum comprises a positioning projection in each portion between adjacent discharging openings or discharging holes, and the other comprises a pair of positioning holes for engaging the positioning projection in each portion between adjacent discharging openings or discharging holes so that engagement of the positioning projection and one of the pair of positioning holes creates the largest effective opening area of the commodity discharging opening, and an engagement of the positioning projection and the other of the pair of positioning holes creates the smallest effective opening area.

3. A commodity discharging device as claimed in claim 2, wherein a stopper for stopping rotation of the opening regulating plate is erected at a peripheral edge portion of each positioning hole so that each positioning projection stopped by the stopper can be fitted into the corresponding positioning hole due to the biasing force of the spring.

4. A commodity discharging device as claimed in claim 3, wherein the stopper has a semicylindrical shape.

5. A commodity discharging device as claimed in claim 1, wherein a rod-like spring for ensuring falling of a commodity into the commodity discharging opening is provided on the opening regulating plate.

6. A commodity discharging device as claimed in claim 1, wherein a rod-like spring for ensuring discharge of a commodity one by one is provided on a commodity discharging passage.

7. A commodity discharging device in an automatic vending machine comprising:

drum means having a commodity discharging opening for discharging a commodity therethrough, for rotating on a vertical shaft;

rotatable and axially slidable opening regulating means having a commodity discharging hole, for changing the effective opening area of the commodity discharging opening by changing the degree of overlap of the commodity discharging opening and the commodity discharging hole; and biasing means for providing the opening regulating means with a biasing force to press it against the drum means, wherein one of the opening regulating means and the drum means comprises a positioning projection and the other comprises a plurality of positioning holes for engaging the positioning projection at a position to keep a predetermined effective opening area, and change of the effective opening area is carried out by sliding the opening regulating means axially away from the drum means and by rotating the opening regulating means to engage the positioning projection with another positioning hole.

* * * * *